United States Patent
Kim et al.

(10) Patent No.: US 9,094,278 B2
(45) Date of Patent: Jul. 28, 2015

(54) APPARATUS, METHOD, AND SYSTEM FOR TRANSMITTING AND RECEIVING HIGH-SPEED DATA IN POINT-TO-POINT FIXED WIRELESS COMMUNICATION

(75) Inventors: Bong Su Kim, Daejeon (KR); Kwang Seon Kim, Daejeon (KR); Min Soo Kang, Daejeon (KR); Woo Jin Byun, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 576 days.

(21) Appl. No.: 13/329,863

(22) Filed: Dec. 19, 2011

(65) Prior Publication Data

US 2012/0163499 A1 Jun. 28, 2012

(30) Foreign Application Priority Data

Dec. 22, 2010 (KR) .......................... 10-2010-0132857

(51) Int. Cl.
*H04L 27/06* (2006.01)
*H04L 27/38* (2006.01)
*H04L 27/36* (2006.01)

(52) U.S. Cl.
CPC .......... *H04L 27/3854* (2013.01); *H04L 27/362* (2013.01)

(58) Field of Classification Search
CPC ............ H04L 27/2613; H04L 27/2657; H04L 1/0023
USPC ......... 375/295, 296, 298, 316, 323, 329, 340, 375/346

See application file for complete search history.

(56) References Cited

U.S. PATENT DOCUMENTS

| 6,240,274 | B1 | 5/2001 | Izadpanah | |
|---|---|---|---|---|
| 6,285,681 | B1* | 9/2001 | Kolze et al. | 370/442 |
| 6,515,976 | B1* | 2/2003 | Dent et al. | 370/336 |
| 8,599,940 | B2* | 12/2013 | Pajukoski et al. | 375/260 |
| 2004/0170121 | A1* | 9/2004 | Kim et al. | 370/208 |
| 2005/0207519 | A1* | 9/2005 | Phang et al. | 375/354 |
| 2009/0217120 | A1* | 8/2009 | Sawahashi et al. | 714/750 |
| 2010/0111229 | A1* | 5/2010 | Kasher et al. | 375/308 |
| 2010/0142648 | A1* | 6/2010 | Yu et al. | 375/316 |
| 2010/0158154 | A1 | 6/2010 | Kang et al. | |
| 2010/0254404 | A1 | 10/2010 | Cordeiro et al. | |
| 2011/0206172 | A1* | 8/2011 | Boutros et al. | 375/354 |

FOREIGN PATENT DOCUMENTS

KR 10-2004-0053074 6/2004
KR 10-2010-0072692 7/2010

\* cited by examiner

*Primary Examiner* — Shuwang Liu
*Assistant Examiner* — David S Huang
(74) *Attorney, Agent, or Firm* — Staas & Halsey LLP

(57) ABSTRACT

Disclosed are an apparatus, method, and system for transmitting and receiving high-speed data in point-to-point (P2P) fixed wireless communication. In an apparatus for transmitting high-speed data in P2P fixed wireless communication, an amplitude zero autocorrelation waveform (CAZAC) sequence generator generates and outputs a CAZAC sequence. A frame generator generates a frame in which the CAZAC sequence is arranged as part of a preamble before a payload including actual data. A continuous wave (CW) generator generates and outputs a CW signal. A multiplexer receives the CW signal output by the CW generator, and arranges and outputs the CW signal in a position before a signal output by the frame generator.

9 Claims, 5 Drawing Sheets

APPARATUS, METHOD, AND SYSTEM FOR TRANSMITTING AND RECEIVING HIGH-SPEED DATA IN POINT-TO-POINT FIXED WIRELESS COMMUNICATION

CLAIM FOR PRIORITY

This application claims priority to Korean Patent Application No. 10-2010-0132857 filed on Dec. 22, 2010 in the Korean Intellectual Property Office (KIPO), the entire contents of which are hereby incorporated by reference.

BACKGROUND

1. Technical Field

Example embodiments of the present invention relate to an apparatus, method, and system for transmitting and receiving high-speed data in point-to-point (P2P) fixed wireless communication, and more particularly, to an apparatus, method, and system for transmitting and receiving high-speed data in P2P fixed wireless communication that may wirelessly transmit high-speed data using digital modulation/demodulation in transmission of a single carrier (SC) scheme of P2P fixed communication using microwave and millimeter wave bands.

2. Related Art

In general, a millimeter wave band refers to a high frequency between 30 GHz and 300 GHz, and has characteristics of a short wavelength and strong straightness close to light. Accordingly, the millimeter wave band is suitable for gigabit per second (Gbps)-level ultra-high-speed broadband transmission, and for low-power short-distance communication in the range of around 1 km due to atmospheric oxygen attenuation.

A frequency of the millimeter wave band is used for communication within university campuses, communication between buildings within a company, island to land communication, high-speed wireless local area network (LAN) communication, and intelligent transport systems (ITS) road side communication by constructing a backbone network for use in P2P fixed wireless transmission, and will also be useful for constructing a wireless communication network to establish a connection between a mobile communication base station and a base station controller in a mountain region or the like in which it is difficult to install an optical cable.

The millimeter wave frequency is internationally used for limited purposes of a wireless personal area network (WPAN), radar, an image sensor, fixed P2P communication, and the like. Recently, technical development and standardization (Institute of Electrical and Electronics Engineers (IEEE) 802.15.3c) of WPAN technology for transmitting uncompressed high-definition (HD) level video using a wide frequency bandwidth in a band of 60 GHz are actively ongoing.

In the case of the millimeter wave, a band of 7 GHz at 60 GHz and a wide band of a total of 10 GHz at 70/80 GHz at which each band is 5 GHz are allocated as frequencies for fixed communication all over the world. A wide bandwidth is significantly advantageous for transmission of high-speed data at Gbps or higher. Thus, many studies are being conducted on wireless communication as means for replacing a wired network because an optical communication rate is rapidly increasing to several tens of Gbps or higher due to the explosive growth in Internet use.

Currently, studies of the millimeter wave band (30 to 300 GHz) are actively ongoing to meet overwhelming domestic and international demand for wideband and ultra-high speed for information communication. A band of 20 to 40 GHz, which is a boundary between a millimeter wave band and a microwave band, is currently being extended for fixed and mobile on the basis of advanced technologies in satellite communication and military communication, and its application examples are a local multipoint distribution system (LMDS) in the US, a microwave video distribution system (MVDS) in Europe, and a broadband wireless local loop (BWLL) in Korea. A frequency band, which is gradually receiving attention, is a band of 60 GHz.

A band of 60 GHz (about 55 to 65 GHz) is available in various application fields because broadband transmission is possible and absorption attenuation of radio waves by oxygen is large. Its representative application examples are a satellite cross link, a military application field, a vehicle anti-collision system, various commercial large-capacity wireless systems, and the like. Application examples of the commercial system are a large-capacity, short-distance communication system, a wireless LAN, and a wireless home link, and the like. In addition, studies of a mobile communication system in which optical band communication is possible in connection with optical communication are actively ongoing. At present, a 60 GHz application system is expected to appear from fourth-generation mobile communication.

FIG. 1 is a conceptual diagram of a general transmission/reception system for use in P2P fixed communication using an analog scheme.

In FIG. 1, a P2P fixed communication system for wirelessly transmitting Gbps-level data using an analog scheme, particularly, an amplitude shift keying (ASK) scheme, is shown.

In the existing method as shown in FIG. 1, an Ethernet signal input from an Internet network is converted into an electrical signal capable of being processed through an optical to electrical (O/E) converter, and the electrical signal is up-converted into a desired frequency band in the ASK scheme using a diode modulator. After a variable attenuator is used to adjust output power, final output power obtained using a high power amplifier is transmitted on a radio channel of a millimeter wave band using an antenna. A received signal input to a reception stage through an antenna is processed in a reverse process.

As described with reference to FIG. 1, a P2P fixed communication method using an analog signal has an advantage in that implementation is simple and easy. However, this method has a limitation in that it will continuously increase a transmission rate in the future because frequency use efficiency is bad. In addition, because the analog signal is not available for reception sensitivity improvement and a digital signal processing function for reducing an error, the performance improvement of the entire system is largely limited.

SUMMARY

Accordingly, example embodiments of the present invention are provided to substantially obviate one or more problems due to limitations and disadvantages of the related art.

Example embodiments of the present invention provide an apparatus, method, and system for transmitting and receiving high-speed data in P2P fixed wireless communication using a frame structure in which various functions such as automatic gain control (AGC), in-phase/quadrature (I/Q) mismatch compensation, timing recovery, frequency recovery, carrier phase recovery, and the like in a reception stage necessary to wirelessly transmit Gbps-level high-speed digital data input from an Internet network may be efficiently performed.

In some example embodiments, an apparatus for transmitting high-speed data in P2P fixed wireless communication, includes: an constant amplitude zero autocorrelation waveform (CAZAC) sequence generator configured to generate and output a CAZAC sequence; a frame generator configured to generate a frame in which the CAZAC sequence is arranged as part of a preamble before a payload including actual data; a continuous wave (CW) generator configured to generate and output a CW signal; and a multiplexer (MUX) configured to receive the CW signal output by the CW generator and arrange and output the CW signal in a position before a signal output by the frame generator.

The apparatus may further include: a quadrature phase shift keying (QPSK) mapper configured to perform QPSK modulation on the CAZAC sequence output by the CAZAC sequence generator and output the modulated CAZAC sequence to the frame generator.

The apparatus may further include: a forward error correction (FEC) encoder configured to perform FEC encoding on the actual data to be transmitted; and a modulator configured to modulate the FEC-encoded actual data using a modulation scheme of QPSK or quadrature amplitude modulation (QAM).

The apparatus may further include: a controller configured to control the frame generator to change a transmission rate according to reception sensitivity of a received signal.

The apparatus may further include: a controller configured to control the modulator to change a transmission rate according to reception sensitivity of a received signal.

In other example embodiments, there is provided an apparatus for receiving and processing a baseband signal having a preamble including a CAZAC sequence and a CW signal in P2P fixed wireless communication for transmitting high-speed data, wherein at least one of initial signal detection, direct current (DC) offset compensation, I/Q mismatch compensation, and frequency offset compensation is performed using the CW signal included in the preamble, and at least one of timing recovery, carrier phase recovery, and preamble end-point detection is performed using the CAZAC sequence included in the preamble.

The apparatus may include: a first timing synchronizer configured to perform coarse timing synchronization; and a second timing synchronizer configured to perform fine timing synchronization.

The apparatus may further include: a DC offset compensator configured to perform an operation for compensating for a DC offset using the CW signal among input signals; and an I/Q mismatch compensator configured to compensate for an I/Q mismatch of a signal output by the DC offset compensator using the CW signal.

The apparatus may further include: a frequency offset compensator configured to perform the frequency offset compensation using the CW signal for a signal from which distortion is removed through the DC offset compensator and the I/Q mismatch compensator.

The apparatus may include: a carrier phase offset compensator configured to compensate for a carrier phase offset in a data-aided scheme in a preamble reception interval and a decision-directed scheme in a data reception interval using the CAZAC sequence among input signals.

The apparatus may further include: a start frame delimiter (SFD) detector configured to detect and output an end point of a preamble and a start point of an information signal using the CAZAC sequence among the input signals; and a demodulator configured to demodulate the phase offset-compensated signal through the phase offset compensator using information regarding the end point of the preamble and the start point of the information signal received from the SFD detector.

The apparatus may further include: a demodulator configured to demodulate a signal phase offset-compensated by a phase offset compensator.

In still other example embodiments, a P2P fixed wireless communication system for transmitting and receiving high-speed data, includes: a radio transmitter configured to generate and transmit a frame by arranging a preamble including a CAZAC sequence and a CW signal before a payload including actual data; and a radio receiver configured to receive a signal from the radio transmitter, perform at least one of initial signal detection, DC offset compensation, I/Q mismatch compensation, and frequency offset compensation using the CW signal included in the preamble of the signal, and perform at least one of timing recovery, carrier phase recovery, and preamble end-point detection using the CAZAC sequence included in the preamble.

In yet other example embodiments, a method of transmitting high-speed data in P2P fixed wireless communication, includes: generating a CAZAC sequence; generating a frame by arranging the CAZAC sequence as part of a preamble before a payload including actual data; generating a CW signal; and arranging and transmitting the CW signal in a position before the CAZAC sequence within the preamble.

In yet other example embodiments, a method of receiving and processing a baseband signal having a preamble including a CAZAC sequence and a CW signal in P2P fixed wireless communication for transmitting high-speed data, includes: detecting an initial signal using the CW signal included in the preamble; compensating for a DC offset of the detected signal using the CW signal; compensating for an I/Q mismatch of the DC offset-compensated signal using the CW signal; compensating for a frequency offset of the I/Q mismatch-compensated signal using the CW signal; performing timing recovery using the CAZAC sequence included in the preamble; performing carrier phase recovery using the CAZAC sequence; and detecting an end point of the preamble using the CAZAC sequence.

In the method, the performing of the timing recovery may include: a first timing synchronization operation of performing coarse timing synchronization; and a second timing synchronization operation of performing fine timing synchronization.

BRIEF DESCRIPTION OF DRAWINGS

Example embodiments of the present invention will become more apparent by describing in detail example embodiments of the present invention with reference to the accompanying drawings, in which.

DESCRIPTION OF EXAMPLE EMBODIMENTS

Figure 1:
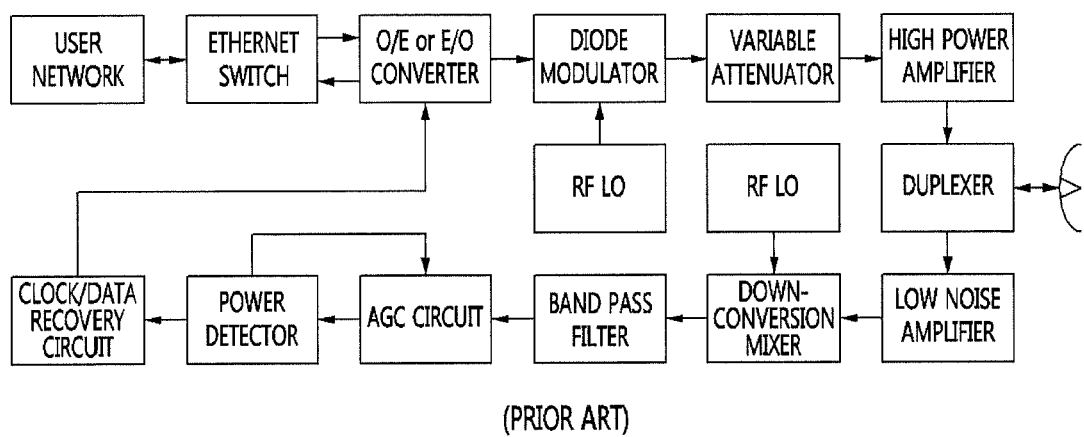
FIG. 1 is a conceptual diagram of a general transmission/reception system for use in P2P fixed communication using an analog scheme.

Example embodiments of the present invention are disclosed herein. However, specific structural and functional details disclosed herein are merely representative for purposes of describing example embodiments of the present invention, however, example embodiments of the present invention may be embodied in many alternate forms and should not be construed as limited to example embodiments of the present invention set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

It will be understood that, although the terms first, second, A, B, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Example embodiments of the present invention relate to a transmission/reception method of transmitting and receiving Gbps-level high-speed data in P2P fixed wireless communication, and more particularly to a transceiver configuration using a frame structure having a simple preamble including a CW signal and a CAZAC sequence upon signal transmission of an SC scheme in a simple channel environment as in a millimeter wave.

According to example embodiments of the present invention, there is provided a wireless transmission/reception method of wirelessly transmitting high-speed data using digital modulation/demodulation in transmission of the SC scheme. It is advantageous in a millimeter wave channel environment for P2P wireless communication based on a millimeter wave when multipath fading is almost absent. From this fact, the present invention is aimed at efficiently transmitting/receiving radio data using a frame structure in which various data recovery functions may be simply performed in a modulator-demodulator (modem).

Hereinafter, the example embodiments of the present invention will be described in detail with reference to the accompanying drawings. To understand the invention easily, the same elements are designated using the same reference numerals, and redundant description thereof is omitted.

Figure 2:
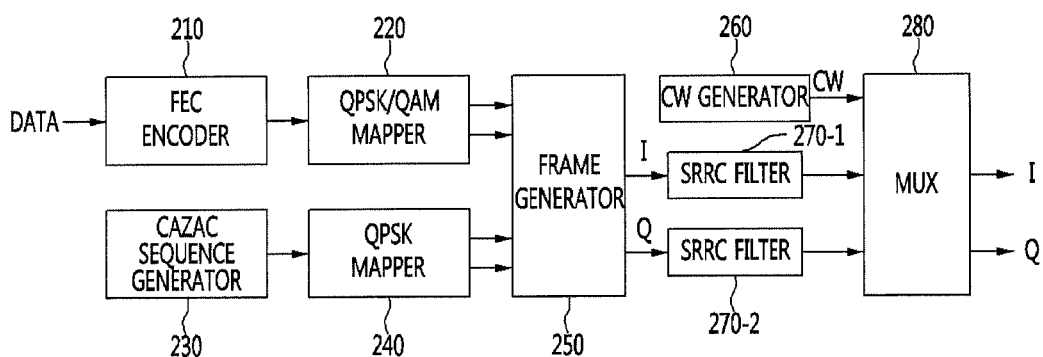
FIG. 2 is a block diagram showing a configuration of a baseband processor of a transmitter according to an example embodiment of the present invention.

FIG. 2 is a block diagram showing a configuration of a baseband processor of a transmitter according to an example embodiment of the present invention.

If high-speed information data is input to the baseband transmitter, an additional code is first inserted through an FEC encoder 210 so that an error occurring in a channel is recovered. The FEC-encoded data is input to a QPSK/QAM mapper 220. The QPSK/QAM mapper 220 serving as a modulator modulates the input data by applying one digital modulation scheme of QPSK and QAM.

At this time, a CAZAC sequence generator 230 generates a predefined CAZAC sequence. The CAZAC sequence is output to a frame generator 250 through a QPSK mapper 240, which performs QPSK modulation.

The frame generator 250 configures a primary frame by adding a CAZAC sequence signal before a designated length of FEC-encoded and modulated information data. At this time, a length of information data may be fixed according to a state of a radio channel upon installation, and may be variable through an exchange of a two-way control signal after installation. After the primary frame configured as described above is separated into I/Q signals, the I/Q signals are output to a MUX 280 through square root raised cosine (SRRC) filters 270-1 and 270-2.

According to an example embodiment of the present invention, a CW signal generated by a CW generator 260 is added to the signals input to the MUX 280. According to an example embodiment of the present invention, the MUX 280 outputs the entire signal after a simple operation of simply adding the CW signal to a position before the data, and the signal output from the MUX 280 is finally transferred to a digital to analog converter (DAC).

Figure 3:
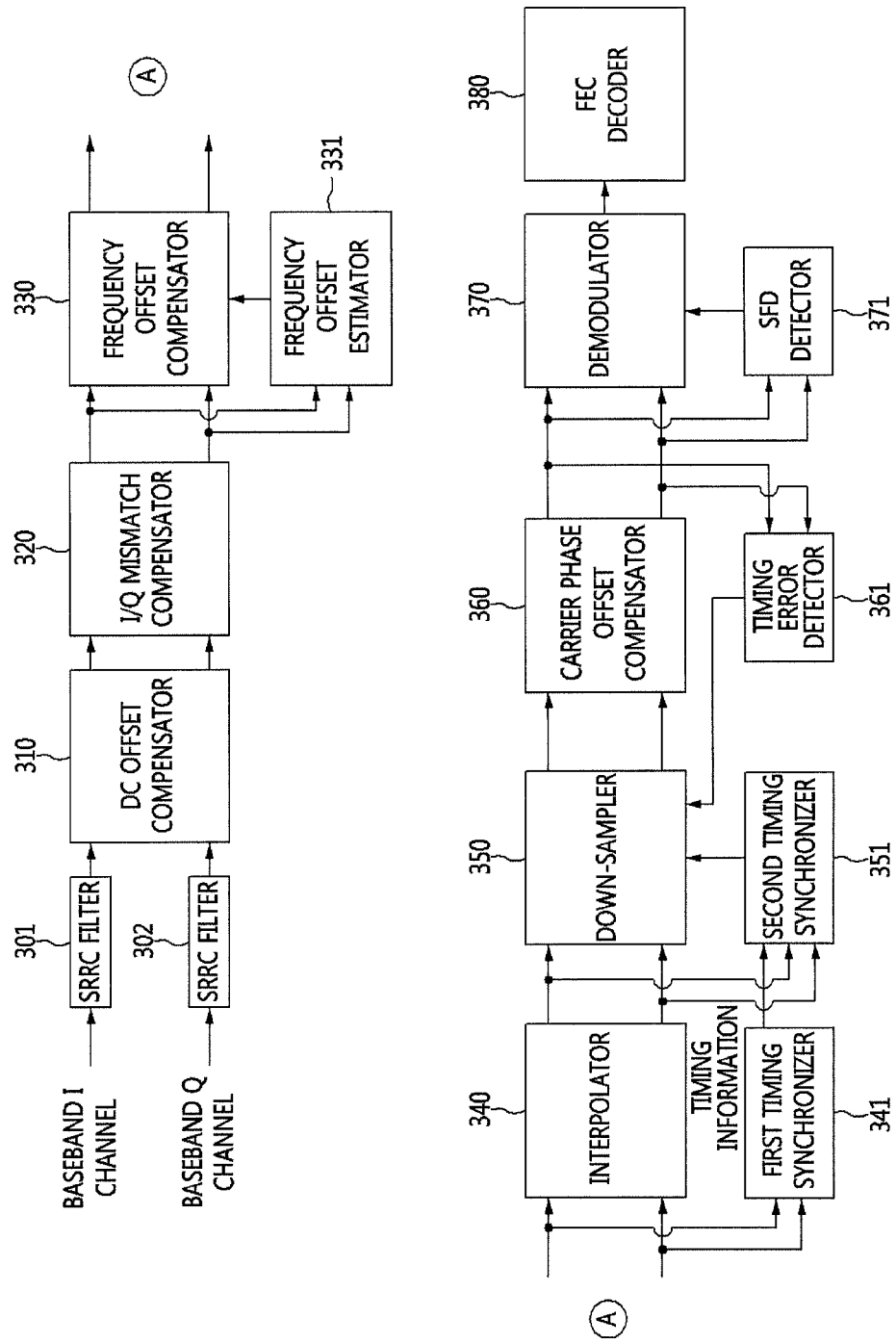
FIG. 3 is a detailed block diagram showing a baseband processor of a receiver according to an example embodiment of the present invention.

FIG. 3 is a detailed block diagram showing a baseband processor of a receiver according to an example embodiment of the present invention.

According to the example embodiment of the present invention, the baseband receiver may include SRRC filters 301 and 302 for a baseband I channel and a baseband Q channel, an offset compensator 310, an I/Q mismatch compensator 320, a frequency offset compensator 330, a frequency offset estimator 331, an interpolator 340, a down-sampler 350, a first timing synchronizer 341, a second timing synchronizer 351, a carrier phase offset compensator 360, a timing error detector 361, a demodulator 370, an SFD detector 371, and an FEC decoder 380.

Received signals input through the ADC are subjected to matched filtering processes in the SRRC filters 301 and 302 for the baseband I channel and the baseband Q channel. The matched filter has characteristics of a raised cosine filter in combination with a pulse shaping filter of the transmitter.

Signals output from the SRRC filters 301 and 302 through matched filtering pass through the DC offset compensator 310 and the I/Q mismatch compensator 320 to remove distortion of a signal which may occur in a channel and an analog circuit. In a DC offset compensation operation and an I/Q mismatch compensation operation, one of a feed-forward scheme and a feed-back scheme may be used according to an implementation method.

The feed-forward scheme has a disadvantage in that, although a structure is simple, a development period is short, and stability is excellent, there is a limitation in performance improvement. On the other hand, the feed-back scheme outperforms the feed-forward scheme. In the I/Q mismatch compensation operation, an I/Q phase mismatch compensation operation and an I/Q amplitude mismatch compensation operation are separately performed. In the I/Q amplitude mismatch compensation operation, an AGC function is automatically performed while each of the I/Q signals is adjusted to a predetermined magnitude.

A signal from which distortion is removed by the DC offset compensator 310 and the I/Q mismatch compensator 320 is input to the frequency offset compensator 330. The frequency offset compensator 330 compensates for a frequency difference between the transmitter and the receiver using frequency offset estimation information estimated by the frequency offset estimator 331, that is, performs an automatic frequency compensation (AFC) operation.

In general, the frequency offset compensation operation is performed after a timing synchronization operation. However, because a data rate is a Gbps level in the P2P fixed wireless transmission system according to an example embodiment of the present invention, it may be technically difficult to compensate for a frequency offset using an information signal at a Gbps-level rate. Accordingly, in an example embodiment of the present invention, the frequency offset compensation operation is first performed before the timing synchronization operation using a CW signal, which has a form of a signal different from a Gbps-level signal.

A frequency offset-compensated signal output by the frequency offset compensator 330 is input to the interpolator 340 and the first timing synchronizer 341. A signal output from the first timing synchronizer 341 is subjected to second timing synchronization by the second timing synchronizer 351.

Timing synchronization using a CAZAC sequence may be largely divided into two operations in which coarse timing synchronization and fine timing synchronization are performed by the first timing synchronizer 341 and the second timing synchronizer 351.

First, the coarse timing synchronization (by the first timing synchronizer 341) is performed using preamble data transmitted from the transmitter. In the coarse timing synchronization process of detecting a position where an auto-correlation value is largest through auto-correlation between a known CAZAC sequence and an input signal, a position of a received signal is detected with accuracy within one symbol.

Thereafter, the fine timing synchronization (by the second timing synchronizer 351) is performed using a result of a coarse timing synchronization calculation. In the fine timing synchronization operation, reception performance is improved by detecting the position of the received signal within a range of an interval that is less than one symbol interval.

According to an example embodiment of the present invention, a position of the received signal is detected through the timing synchronization processes of the two operations.

The interpolator 340 performs an interpolation process. A timing-synchronized signal is input to the down-sampler 350, which performs a down-sampling process for the input signal. A down-sampled signal is input to the carrier phase offset compensator 360.

Carrier phase offset compensation by the carrier phase offset compensator 360 is performed using a CAZAC sequence. The residual frequency is processed after the frequency offset is compensated for in the AFC process.

In this process, compensation is continuously performed over a total frame interval using a data-aided scheme in a preamble interval and a decision-directed scheme in a data reception interval. A carrier phase offset-compensated signal is input to the demodulator 370. For example, a 16-QAM decision operation or the like is performed.

On the other hand, a signal output by the carrier phase offset compensator is input to the timing error detector 361. Timing error information output by the timing error detector 361 is fed back to the down-sampler 350.

The carrier phase offset-compensated signal is additionally input to the SFD detector 371. The SFD detector 371 detects an end point of a preamble and a start point of an information signal through an SFD function in a last process using the CAZAC sequence. This detection information is transferred to the demodulator, so that data reception is prepared.

The received signal processed by the series of processes as described above passes through the FEC decoder 380 to detect and correct an error occurring on a channel, so that the performance of a bit error rate (BER) is improved.

Figure 4:
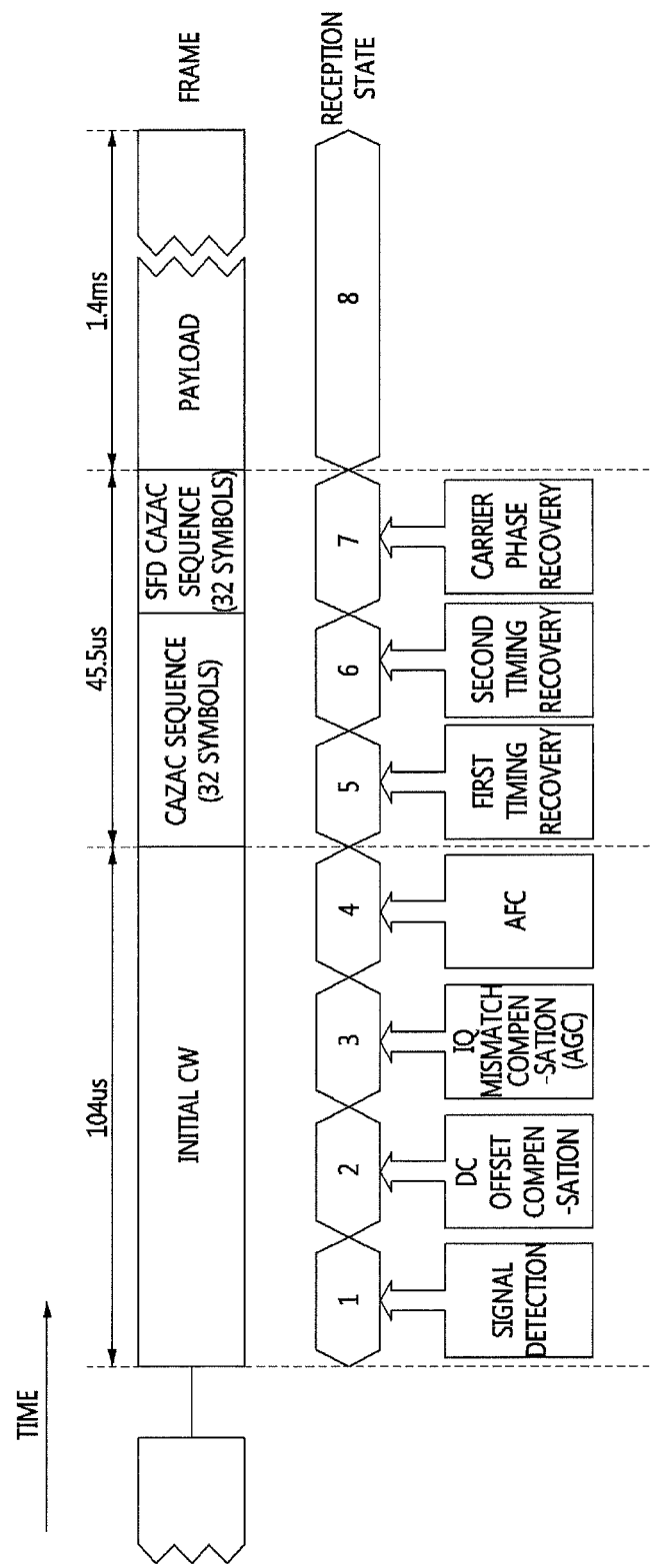
FIG. 4 is a diagram illustrating a structure of a frame generated and transmitted by a transmission stage and a reception state and a state-specific operation in a reception stage according to an example embodiment of the present invention.

FIG. 4 is a diagram illustrating a structure of a frame generated and transmitted by a transmission stage and a reception state and a state-specific operation in a reception stage according to an example embodiment of the present invention.

An upper part of FIG. 4 shows an example of a structure of a frame generated by the transmission stage, and its lower part shows a reception state and an operation in the reception stage according to the frame structure in the upper part.

When a frame structure for P2P fixed wireless transmission according to an example embodiment of the present invention is based on one frame unit, a frame has a preamble including a CW signal and a CAZAC sequence and a payload including actual data.

The CW signal having a length of 104 μs is arranged in front of the preamble. According to an example embodiment of the present invention, the CW signal has a band of several MHz. In the reception stage using the CW signal, initial signal detection (state_1), DC offset compensation (state_2), I/Q mismatch compensation and AGC (state_3), and AFC (state_4) are performed.

The CAZAC sequence having a length of 45.5 μs is positioned after the CW signal. The CAZAC sequence includes a sequence having 32 symbols of which an average is 0 and an SFD CAZAC sequence having 32 symbols.

The CAZAC sequence in a preceding position is used in the reception stage for a first timing recovery operation (state_5) in which coarse timing recovery is performed and a second timing recovery operation (state_6) in which fine timing recovery is performed. The SFD CAZAC sequence subsequent to the CAZAC sequence is used for an operation (state_7) for carrier phase recovery and a preamble end indication.

If the preamble ends, an iterative process in which data (state_8) having a designated length is transmitted and a preamble re-starts is performed. Although a payload length in which the data is transmitted is 1.4 ms in FIG. 4, the length may differ according to a transmission environment. The payload length that may differ according to the transmission environment will be described in further detail with reference to FIG. 6.

When a length of data is long, a length of a preamble is relatively short and transmission efficiency is increased. According to the long data length, the modem should exhibit excellent performance so that frequency recovery, timing recovery, carrier phase recovery, and the like can operate normally.

The frame structure shown in FIG. 4 according to the example embodiment of the present invention may be expected to be more effective in an environment in which the effect of multipath fading is small as in a millimeter wave. It is possible to provide more reliable communication by increasing transmission efficiency with small overhead and efficiently removing various noise components.

Figure 5:
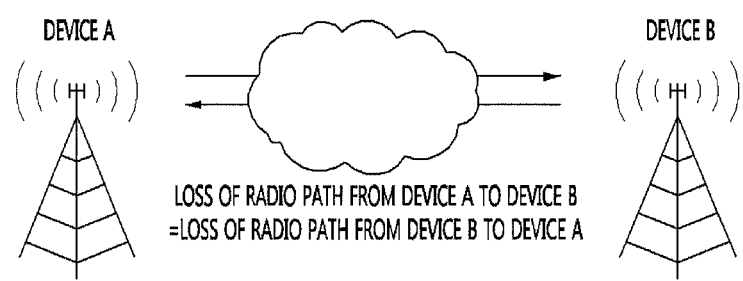
FIG. 5 shows radio channels viewed from two ways when a radio link is configured according to an example embodiment of the present invention.

FIG. 5 shows radio channels viewed from two ways when a radio link is configured according to an example embodiment of the present invention.

A P2P high-speed transmission environment considered in an example embodiment of the present invention is based on the assumption that a radio environment between a fixed communication device A and a fixed communication device B is a line-of-sight (LOS) environment in which an obstacle such as a building within a straight-line path connected between the communication devices is absent and the effect of multipath fading is small as shown in FIG. 5.

In addition, in terms of radio channel environments for P2P high-speed transmission according to an example embodiment of the present invention, radio channel environments (atmospheric attenuation, rain attenuation, various delays, and the like) when data is transmitted from the communication device A to the communication device B are not largely different from radio channel environments when data is transmitted from the communication device B to the communication device A.

When the above-described conditions are used, a state in which data transmitted by the communication device A is received by the communication device B may be predicted on the basis of a state of data received by the device A. At this time, it is preferable that a performance difference between the communication device A and the communication device B be sufficiently small to be negligible.

When reception sensitivity of received data is good, the communication device A may increase a transmission rate using the following two methods.

First, it is possible to increase the entire rate by making a change to a modulation scheme having a higher transmission rate than a modulation scheme used during previous transmission.

Second, it is possible to increase a transmission rate by increasing an amount of information data within a frame and relatively reducing a length of a preamble within the entire frame.

Figure 6:
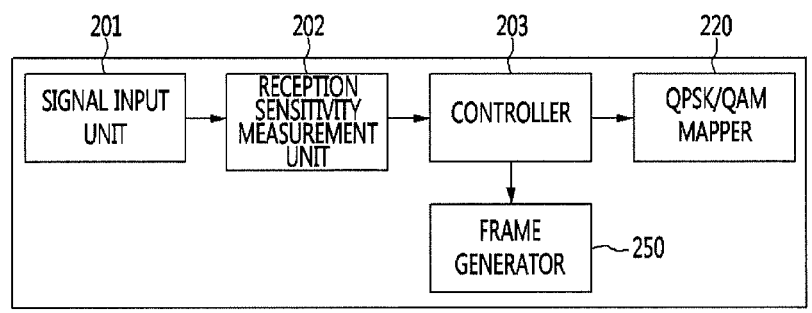
FIG. 6 is a diagram showing functional blocks of a transmission stage related to a transmission rate change based on a state of received data according to an example embodiment of the present invention.

FIG. 6 is a diagram showing functional blocks of a transmission stage related to a transmission rate change based on a state of received data according to an example embodiment of the present invention.

For a transmission rate change according to a state of received data, the transmission stage according to the example embodiment of the present invention includes a signal input unit 201, a reception sensitivity measurement unit 202, a controller 203, a QPSK/QAM mapper 220, and a frame generator 250.

Here, the QPSK/QAM mapper 220 and the frame generator 250 are the same blocks as those shown in FIG. 2.

The reception sensitivity measurement unit 202 measures reception sensitivity of a signal input to the signal input unit 201. Information regarding the reception sensitivity of the input signal is input to the controller 203, and the controller 203 changes a transmission rate according to the signal reception sensitivity.

At this time, in a method of adjusting a modulation scheme of data according to reception sensitivity as an example embodiment of the mechanism of a transmission rate change used by the controller 203, a change to a modulation scheme having a higher transmission rate than a modulation scheme used during previous transmission may be made when reception sensitivity is good, and a change to a modulation scheme having a lower transmission rate than the modulation scheme used during the previous transmission may be made when the reception sensitivity is bad.

In a method of adjusting an amount of information data within one frame according to sensitivity of a received signal as another example embodiment, a transmission rate is raised by increasing an amount of data in one frame and relatively reducing a length of a preamble within the entire frame when the sensitivity of the received signal is good, and the length of the preamble within the entire frame is relatively increased by reducing an amount of data within one frame when the sensitivity of the received signal is bad.

The controller 203 controls operations of the QPSK/QAM mapper 220 or the frame generator 250 according to a selected transmission rate change method.

That is, when the method of adjusting the data modulation scheme according to the reception sensitivity is used, the controller 203 controls the QPSK/QAM mapper 220 to change the modulation scheme. When the method of adjusting the amount of information data according to the reception sensitivity is used, the controller 203 controls the frame generator 250 to adjust the amount of information data upon frame generation, so that a length of one frame is also adjusted.

Figure 7:
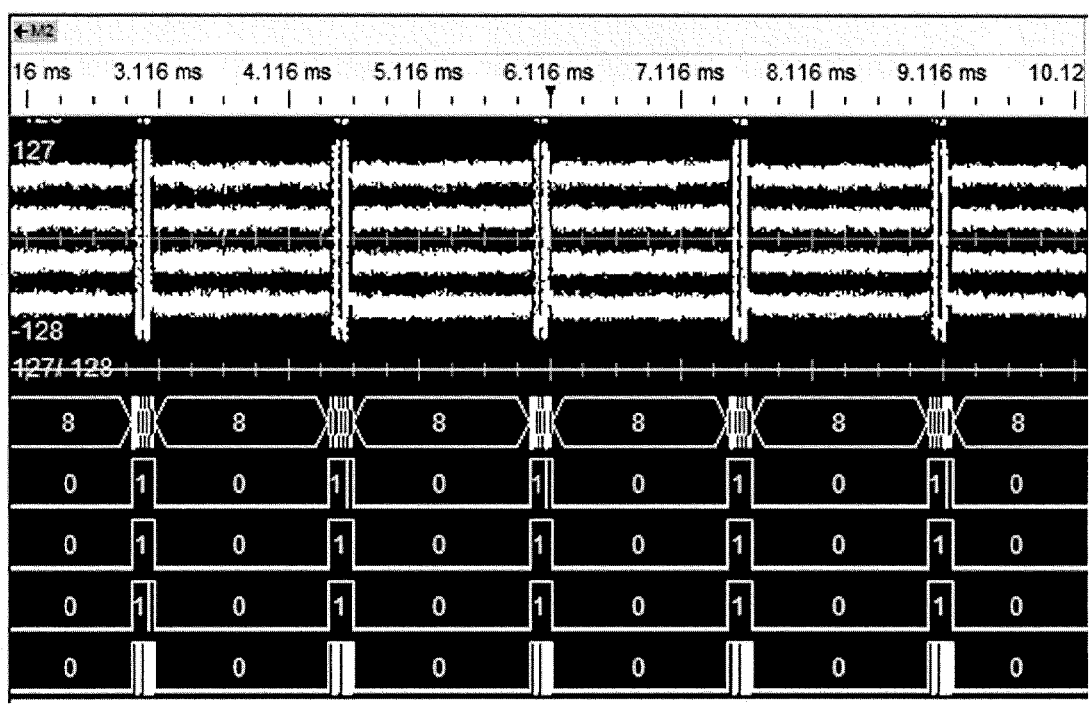
FIG. 7 is a graph showing analysis results of sample values analyzed by a logic analyzer in the operation of determining a 16-QAM signal at a rate of 1.56 Gbps in a P2P wireless transmission system manufactured according to an example embodiment of the present invention.

FIG. 7 is a graph showing analysis results of sample values analyzed by a logic analyzer in the operation of determining a 16-QAM signal at a rate of 1.56 Gbps in a P2P wireless transmission system manufactured according to an example embodiment of the present invention.

White lines shown in an upper part of FIG. 7 are received data of 4 lines shown in a 16-QAM decision operation performed by the demodulator 370 of the reception stage. From FIG. 7, it can be seen that frames are continuously generated.

Here, a state indicated by reference numeral 8 indicates data and a part before the state 8 indicates a preamble.

According to the example embodiments of the present invention as described above, it is possible to efficiently remove and compensate for various errors and noise occurring in a radio channel and a transceiver using a frame structure with a simple preamble including a CW signal and a CAZAC sequence so that Gbps-level high-speed data is wirelessly transmitted in microwave and millimeter wave band channel environments.

In addition, it is possible to facilitate implementation and verification using a simple frame structure proposed in the example embodiment of the present invention and to increase the entire transmission rate by reducing an overhead amount to increase data transmission efficiency.

While the example embodiments of the present invention and their advantages have been described in detail, it should be understood that various changes, substitutions and alterations may be made herein without departing from the scope of the invention.

What is claimed is:

1. A baseband processor for receiving and processing a baseband signal having a preamble including a constant amplitude zero autocorrelation waveform (CAZAC) sequence and a continuous wave (CW) signal point-to-point (P2P) fixed wireless communication for transmitting high-speed data, the processor comprising:
    a DC offset compensator performing an operation of a DC offset compensation using the CW signal among input signals; and
    an I/Q mismatch compensator compensating for an I/Q mismatch of a signal output by the DC offset compensator using the CW signal,
    wherein at least one of initial signal detection, direct current (DC) offset compensation, in-phase/quadrature (I/Q) mismatch compensation, and frequency offset compensation is performed using the CW signal included in the preamble, and at least one of timing recovery, carrier phase recovery, and preamble end-point detection is performed using the CAZAC sequence included in the preamble.

2. The baseband processor of claim 1, comprising:
    a first timing synchronizer performing coarse timing synchronization; and
    a second timing synchronizer performing fine timing synchronization.

3. The baseband processor of claim 1, further comprising a frequency offset compensator performing the frequency offset compensation using the CW signal for a signal from which distortion is removed through the DC offset compensator and the I/Q mismatch compensator.

4. The baseband processor of claim 1, comprising a carrier phase offset compensator compensating for a carrier phase offset in a data-aided scheme in a preamble reception interval and a decision-directed scheme in a data reception interval using the CAZAC sequence among input signals.

5. The baseband processor of claim 4, further comprising:
    a start frame delimiter (SFD) detector detecting and outputting an end point of a preamble and a start point of an information signal using the CAZAC sequence among the input signals; and
    a demodulator demodulating the phase offset-compensated signal through the phase offset compensator using information regarding the end point of the preamble and the start point of the information signal received from the SFD detector.

6. The baseband processor of claim 1, comprising a demodulator demodulating a signal phase offset-compensated by a phase offset compensator.

7. A point-to-point (P2P) fixed wireless communication system for transmitting and receiving high-speed data, comprising:
    a radio transmitter generating and transmitting a frame by arranging a preamble including a constant amplitude zero autocorrelation waveform (CAZAC) sequence and a continuous wave (CW) before a payload including actual data; and
    a radio receiver receiving a signal from the radio transmitter, performing at least one of initial signal detection, DC offset compensation, I/Q mismatch compensation, and frequency offset compensation using the CW signal included in the preamble of the signal, and performing at least one of timing recovery, carrier phase recovery, and preamble end-point detection using the CAZAC sequence included in the preamble,
    wherein the radio receiver comprises a DC offset compensator performing an operation of a DC offset compensation using the CW signal among input signals; and an I/Q mismatch compensator compensating for an I/Q mismatch of a signal output by the DC offset compensator using the CW signal.

8. A method of receiving and processing a baseband signal having a preamble including a constant amplitude zero autocorrelation waveform (CAZAC) sequence and a continuous wave (CW) signal in point-to-point (P2P) fixed wireless communication for transmitting high-speed data, comprising:
    detecting an initial signal using the CW signal included in the preamble;
    compensating for a DC offset of the detected signal using the CW signal;
    compensating for an I/Q mismatch of the DC offset-compensated signal using the CW signal;
    compensating for a frequency offset of the I/Q mismatch-compensated signal using the CW signal;
    performing timing recovery using the CAZAC sequence included in the preamble;
    performing carrier phase recovery using the CAZAC sequence; and
    detecting an end point of the preamble using the CAZAC sequence.

9. The method of claim 8, wherein the performing of the timing recovery includes:
    a first timing synchronization operation of performing coarse timing synchronization; and
    a second timing synchronization operation of performing fine timing synchronization.

* * * * *